United States Patent [19]

Hidaka

[11] Patent Number: 5,055,933
[45] Date of Patent: Oct. 8, 1991

[54] AUTOMATIC FOCUSING APPARATUS AND AUTOMATIC FOCUSING METHOD FOR AUTOMATICALLY MATCHING FOCUS IN RESPONSE TO VIDEO SIGNAL

[75] Inventor: Masaru Hidaka, Nara, Japan
[73] Assignee: Sanyo Electric Co., Ltd., Japan
[21] Appl. No.: 616,082
[22] Filed: Nov. 20, 1990
[30] Foreign Application Priority Data
Nov. 22, 1989 [JP] Japan .................................. 1-303857
[51] Int. Cl.[5] ..................... H04N 5/232; H04N 5/275; H04N 5/238
[52] U.S. Cl. .................................. 358/227; 358/225; 358/228; 354/400; 354/402
[58] Field of Search ............... 358/228, 227, 225, 224, 358/213.13, 213.19; 354/400, 402, 404

[56] References Cited

U.S. PATENT DOCUMENTS

| | | | |
|---|---|---|---|
| 4,316,657 | 2/1982 | Suzuki et al. ....................... | 354/402 |
| 4,381,523 | 4/1983 | Eguchi et al. ...................... | 358/227 |
| 4,614,975 | 9/1986 | Kaite ................................. | 358/227 |
| 4,638,364 | 1/1987 | Hiramatsu ........................... | 358/227 |
| 4,833,541 | 5/1989 | Takuma .............................. | 358/227 |
| 4,841,370 | 6/1989 | Musashima et al. ................ | 354/402 |
| 4,853,189 | 8/1989 | Murashina et al. ................. | 358/225 |
| 4,853,788 | 8/1989 | Murashima ......................... | 358/227 |
| 4,872,058 | 10/1989 | Baba et al. .......................... | 354/402 |
| 4,903,134 | 2/1990 | Murashina .......................... | 358/225 |
| 4,920,420 | 4/1990 | Sono et al. ......................... | 358/227 |
| 4,922,346 | 5/1990 | Hidaka et al. ...................... | 358/277 |
| 4,967,279 | 10/1990 | Murashima ......................... | 354/400 |

FOREIGN PATENT DOCUMENTS

58-58505 4/1983 Japan .
60-103776 6/1985 Japan .
1-8771 1/1989 Japan .

Primary Examiner—James J. Groody
Assistant Examiner—Glenton B. Burgess
Attorney, Agent, or Firm—Peter L. Michaelson

[57] ABSTRACT

In automatic focusing apparatus of a video camera, any of the entire area, the central area and the midmost area of a picture is selected as an in-focus target area, so that an automatic focusing operation is performed in accordance with a focus evaluating value of the in-focus target area. When the entire area of the picture is selected as the in-focus target area, a focus evaluating value of the central area of the picture is simultaneously evaluated. When the automatic focusing operation starts, the entire area of the picture is selected as the in-focus target area, and if the focus evaluating value of the central area becomes higher than a predetermined value, the in-focus target area is switched to the central area of the picture. When the midmost area of the picture is manually set as the in-focus target area, the midmost area is selected with priority as the in-focus target area.

20 Claims, 4 Drawing Sheets

AUTOMATIC FOCUSING APPARATUS AND AUTOMATIC FOCUSING METHOD FOR AUTOMATICALLY MATCHING FOCUS IN RESPONSE TO VIDEO SIGNAL

"This application is a continuation of U.S. Ser. No. 07/587,405 filed Sept. 25, 1990."

BACKGROUND OF THE INVENTION

1. Field of the Invention

The present invention relates generally to automatic focusing apparatus and an automatic focusing methods and, more particularly, to improvements of automatic focusing apparatus and an automatic focusing method for automatically matching a focus relative to an object in response to a video signal obtained from an image sensor, in image sensing apparatus such as a video camera having an automatic focusing mechanism.

2. Description of the Background Art

Conventionally, as an automatic focusing method adopted in image sensing apparatus such as a video camera, for example, a method has been developed, in which a video signal per se obtained from an image sensor is employed to evaluate a state in which focus is controlled. In this method, no parallax substantially exists. The method has many excellent characteristics, e.g., accurate focusing is achieved even when the depth of field is small and when an object is located in the distance. Moreover, this method requires no special sensor for automatic focusing to be provided separately and provides an extremely simple mechanism.

As one example of the automatic focusing methods employing a video signal, a so-called hill-climbing servo system has been conventionally known. This hill-climbing servo system is described in U.S. Pat. application Nos. 4,638,364 and 4,614,975 and Japanese Patent Laying-Open Nos. 58-58505 and 60-103776. Briefly, in the hill-climbing servo system, a high frequency component of a video signal obtained from an image sensor is detected every one field as a focus evaluating value, and the detected focus evaluating value is always compared with a focus evaluating value detected one field before. Then, the position of a focusing lens continues slightly vibrating such that the focus evaluating value always takes the maximal value.

In addition, Japanese Patent Laying-Open No. 1-8771 discloses improved automatic focusing apparatus employing the hill-climbing servo system.

Figure 1:
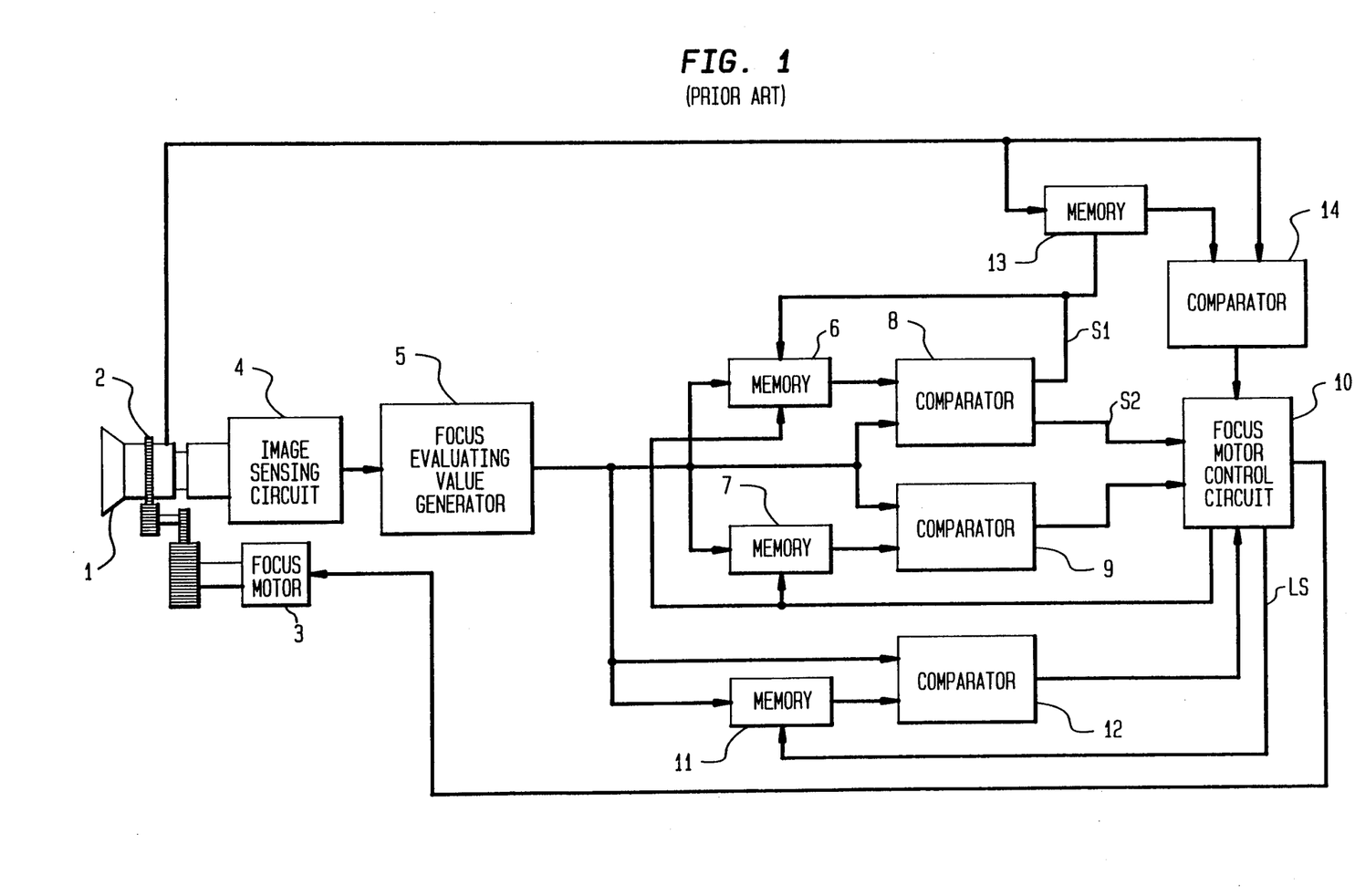
FIG. 1 is a schematic block diagram showing conventional automatic focusing apparatus.
Figure 2:
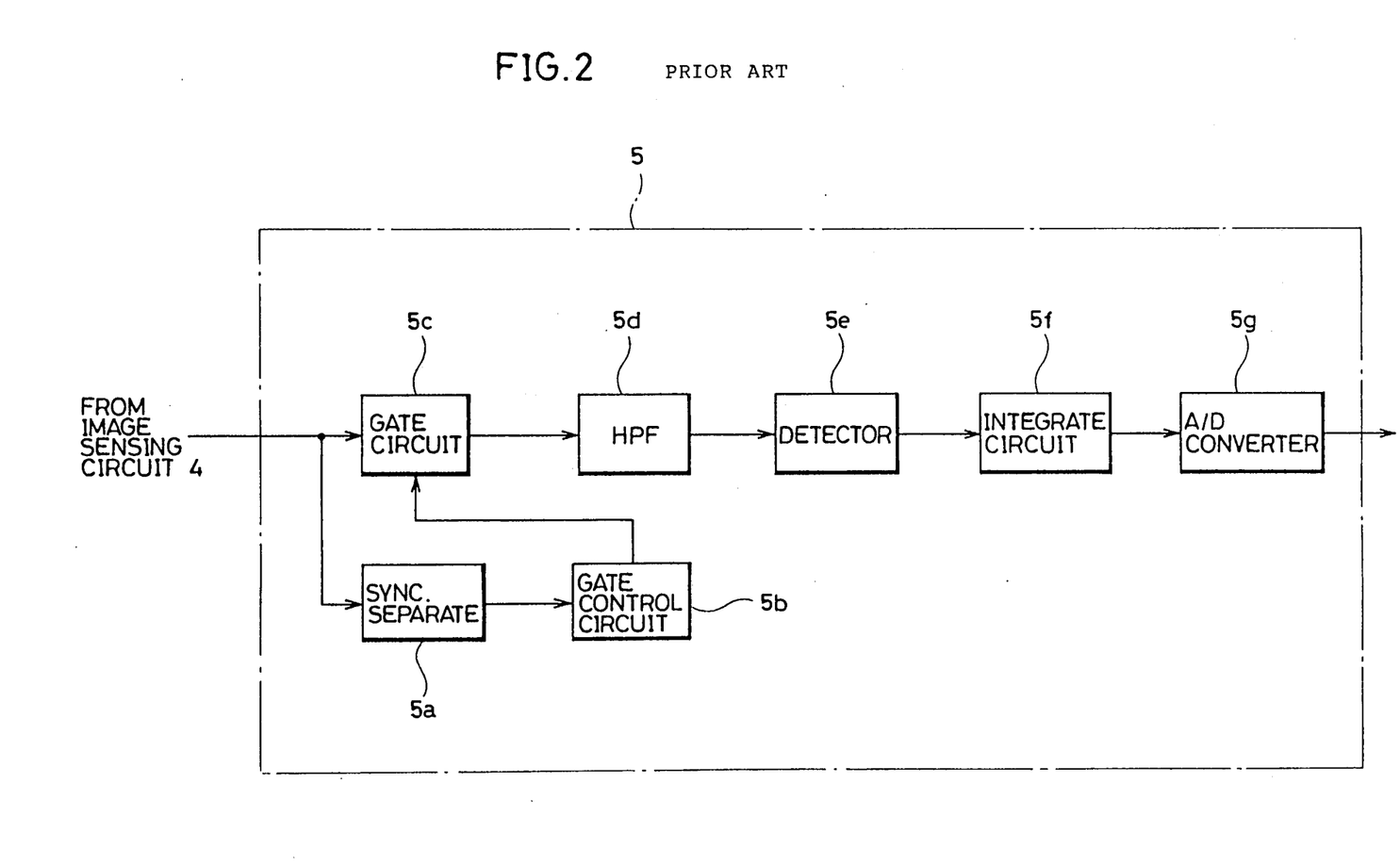
FIG. 2 is a block diagram showing the details of a focus evaluating value generating circuit shown in FIG. 1.

FIG. 1 is a schematic block diagram showing such improved automatic focusing apparatus, and FIG. 2 is a block diagram showing the details of a focus evaluating value generating circuit shown in FIG. 1.

With reference to FIG. 1, a video camera includes a focusing ring 2 for moving a focusing lens 1 forward and backward along an optical axis, a focusing motor 3 for driving this focusing ring 2, and an image sensing circuit 4 including an image sensor (not shown) such as a CCD (Charge-Coupled Device). Focusing lens 1 may be moved by a piezoelectric element instead of a motor. Further, the image sensor itself (not shown) such as the CCD in place of the focusing lens may be moved by the piezoelectric element.

An image formed on a surface of the image sensor by focusing lens 1 is converted into a video signal by image sensing circuit 4 and then applied as an input to a focus evaluating value generating circuit 5. With reference to FIG. 2 showing the details of focus evaluating value generating circuit 5, a luminance signal component in a video signal supplied as an output from image sensing circuit 4 is applied to a synchronization separating circuit 5a and a gate circuit 5c. Synchronization separating circuit 5a separates a vertical synchronizing signal VD and a horizontal synchronizing signal HD from the applied luminance signal, to apply the separated signals to a gate control circuit 5b. Gate control circuit 5b sets a rectangular sampling area (an in-focus target area) in, e.g., a central portion of a picture in response to the applied vertical synchronizing signal VD and horizontal synchronizing signal HD and a fixed output of an oscillator (not shown). Gate control circuit 5b then applies a signal for opening or closing a gate every field to gate circuit 5c so as to allow passage of the luminance signal only in the range of the sampling area. This gate circuit 5c may be provided anywhere at the preceding stage of an integrating circuit 5f which will be described later.

Only the luminance signal corresponding to the range of the sampling area is applied to a high-pass filter 5d by gate circuit 5c every field. A high frequency component of the video signal separated by high-pass filter 5d is amplitude-detected by a detecting circuit 5e, and a detection output thereof is applied to integrating circuit 5f. Integrating circuit 5f then integrates the applied detection output every field and applies the integrated output to an A/D converting circuit 5g. This A/D converting circuit 5g converts the applied integrated value into a digital value and supplies the digital value as a focus evaluating value in the present field.

A description is now made on an operation which is performed immediately after an automatic focusing operation starts. Immediately after the automatic focusing operation starts, a focus evaluating value corresponding to the first one field supplied as an output from focus evaluating value generating circuit 5 is first applied to a memory 6 for holding the maximum value and a memory 7 for holding the initial value and then held therein. Thereafter, a focusing motor control circuit 10 rotates focusing motor 3 in a predetermined direction, to displace focusing lens 1 along the optical axis. Then, a comparator 9 compares the initial focus evaluating value held in initial value memory 7 with the present focus evaluating value output from focus evaluating value generating circuit 5, to generate a comparison signal. Focusing motor control circuit 10 initializes the direction of the rotation of focusing motor 3 in response to the generated comparison signal.

More specifically, focusing motor control circuit 10 keeps rotating focusing motor 3 in the predetermined direction until comparator 9 generates a comparison output indicating "large" or "small". If comparator 9 supplies a comparison output indicating that the present focus evaluating value is larger than the initial focus evaluating value held in memory 7, focusing motor control circuit 10 maintains the above-described predetermined rotational direction. Conversely, if a comparison output indicating that the present focus evaluating value is smaller by more than a predetermined change width than the initial focus evaluating value is supplied by comparator 9, focusing motor control circuit 10 reverses the rotational direction of focusing motor 3.

The initialization of the rotational direction of focusing motor 3 is thus completed. Focusing motor control circuit 10 thereafter monitors an output of a comparator 8. In order to prevent malfunctions due to noise of the focus evaluating value, comparator 9 is adapted not to generate the comparison output indicating "large" or "small" while the difference between the initial focus evaluating value and the present focus evaluating value does not exceed the predetermined change width.

Comparator 8 compares the present maximum focus evaluating value so far held in maximum value memory 6 with the present focus evaluating value supplied by focus evaluating value generating circuit 5, to output a comparison signal S when the present focus evaluating value is larger than the focus evaluating value held in memory 6 and output a comparison signal $S_2$ when the present focus evaluating value decreases by more than a predetermined first threshold value. When the present focus evaluating value is larger than the contents of memory 6, the contents of memory 6 is updated in response to the output $S_1$ of comparator 8, so that the maximum focusing evaluating value so far is always held in memory 6.

A signal indicating the position of a focusing ring is generated from focusing ring 2 in correspondence with the position of focusing ring 2 supporting focusing lens 1. The generated focusing ring position signal is applied to a memory 13 for holding the position of the focusing ring. This focusing ring position memory 13 is updated in response to the output of comparator 8 so as to constantly hold a focusing ring position signal to be generated when the focus evaluating value becomes the maximum value.

Focusing motor control circuit 10 monitors the output of comparator 8 while rotating focusing motor 3 in the direction initialized in response to the output of comparator 9, as described above. When the comparison output $S_2$ indicating that the present focus evaluating value decreases by more than the above-described first threshold value as compared with the maximum focus evaluating value is supplied by comparator 8, focusing motor control circuit 10 generates a signal for reversing the rotational direction of focusing motor 3. To prevent malfunctions due to noise of the focus evaluating value, the rotational direction of focusing motor 3 is not reversed until the present focus evaluating value decreases by more than the predetermined first threshold value. This reversal of the rotational direction of focusing motor 3 causes the direction, in which focusing lens 1 moves, to change from the direction, in which the focusing lens moves toward the image sensor, to the direction, in which the lens moves away from the image sensor, or vice versa.

After the rotational direction of focusing motor 3 is reversed, a comparator 14 compares the contents of memory 13, corresponding to the maximum focusing evaluating value, with the present focusing ring position signal generated from focusing ring 2. When both match each other, i.e., focusing ring 2 returns to the position where the focus evaluating value becomes the maximum value, focusing motor control circuit 10 stops the rotation of focusing motor 3. Simultaneously, focusing motor control circuit 10 outputs a lens stop signal LS. A series of automatic focusing operations are thus completed.

In the above-described manner, in the conventional automatic focusing apparatus shown in FIG. 1, the focusing evaluating value is evaluated with focusing lens 1 moving from a close point to a distant point. When the focusing evaluating value decreases by more than a predetermined threshold value below the maximum focusing evaluating value at a certain time point during the movement of focusing lens 1, a determination is made that a lens position where the above-described maximum value (hereinafter referred to as a peak value) is obtained is an in-focus position, so that the automatic focusing operation is terminated.

When an object having a small amount of a high frequency component such as walls having no design thereon or clouds in the sky, for example, is taken, there is a case that the above-described peak value of the focus evaluating value cannot be obtained even if the focusing lens is moved to cover the whole distance from a cross point to a distant point. It is now assumed that this mode is called an ETOE (END TO END) mode. In the ETOE mode, a determination is made that a lens position where the maximum value of the focus evaluating value is obtained is an in-focus position in the course of movement of the lens, so that the automatic focusing operation is terminated.

A memory 11 and a comparator 12 serve as circuits for restarting the automatic focusing operation by focusing motor control circuit 10 when the focus evaluating value changes by a predetermined second threshold value or more after the focusing lens stops. More specifically, a focus evaluating value at the time point when the automatic focusing operation by focusing motor control circuit 10 is terminated and lens stop signal LS is then generated is held in memory 11. Then, comparator 12 compares the contents of memory 11 with the present focus evaluating value supplied as an output from focus evaluating value generating circuit 5. If the difference therebetween becomes larger than the predetermined second threshold value, it is considered that an object changes, and a signal indicating the change of the object is applied to focusing motor control circuit 10. As a result, the automatic focusing operation by focusing motor control circuit 10 restarts, so that an automatic focusing operation following the change of the object is achieved.

Now, as manner of setting an in-focus target area (sampling area) to be a target of a focus control, such a method is considered that two types of in-focus target areas, i.e., the entire area of a picture and the central area thereof (which requires, e.g., ¼ of the entire picture area) are provided, and these two areas are appropriately switched in response to an area selecting signal generated from the focusing motor control circuit in accordance with the situation of an object.

In this method, however, if the timing to select the in-focus target area is inappropriate, a user has a disordered impression that a malfunction takes place.

Such a case is now considered, for example, that when the central area of the picture is selected as the in-focus target area, to attain an in-focus state, the object moves from the center to the side of the picture out of the in-focus target area in the center. Since the object itself does not disappear from the picture, it is totally unnecessary for the user that the automatic focusing operation is re-activated. However, if the switching of the in-focus target area from the central area to the entire area of the picture is not smoothly performed, so that the central area continues to be selected as the in-focus target area, the focus evaluating value substantially decreases because the object in the central area disappears. Thus, the automatic focusing operation is re-started, so that lens 1 moves. As a result, a hunting sometimes occurs.

Conversely, such a case is considered that when the entire area of the picture is selected as the in-focus target area, to attain the in-focus state, the object moves from the periphery of the picture to the center and enters in the central area of the picture. In this case, if the switching of the in-focus target area from the entire area to the central area of the picture is not smoothly performed, so that the entire area of the picture is kept selected as the in-focus target area, the object in the central area of the picture, which is to be brought into focus, cannot be actually brought into focus if an object having a large amount of the high frequency component exists in the periphery of the picture.

SUMMARY OF THE INVENTION

One object of the present invention is to provide an automatic focusing apparatus and an automatic focusing method, in which a malfunction of an automatic focusing operation can be prevented by switching an in-focus target area at proper timing in accordance with the state of an object.

Another object of the present invention is to provide an automatic focusing apparatus and an automatic focusing method, in which priority is given to the intention of a user relative to an object to be brought into focus.

A further object of the present invention is to provide an automatic focusing apparatus and an automatic focusing method, in which it is less liable to occur that the position of a lens is fixed in accordance with an erroneous determination that the maximum value of a focus evaluating value due to noise or the like indicates an in-focus state.

To summarize, the present invention is directed to an automatic focusing apparatus for automatically matching a focus relative to an object in response to a video signal obtained from an image sensing circuit having a focusing lens and an image sensing device. This automatic focusing apparatus includes a relative position altering apparatus for altering a relative position of the focus lens along an optical axis with respect to the image sensing device, a selecting circuit for setting by time-division of a video signal a midmost area of an image-sensed picture, a central area of the picture including this midmost area and having a larger a real size, and an entire picture area of the picture including this central area and having a larger a real size, so as to select any of those regions as an in-focus target area, an instructing circuit for center area priority control for selecting the midmost area of the picture as the in-focus target area, a first focus evaluating value detecting circuit for detecting a focus evaluating value in the in-focus target area, a focusing motor control circuit for controlling the relative position altering apparatus so as to shift the relative position of the focusing lens to a position where this focus evaluating value becomes a peak value, a second focus evaluating value detecting circuit for detecting a focus evaluating value in the central area of the picture when the entire area of the picture is selected as the in-focus target area, and a circuit for controlling the in-focus target area selecting circuit so as to select the entire area as the in-focus target area when a focusing operation starts, then to switch the in-focus target area into the central area of the picture when the focus evaluating value supplied by the second focus evaluating value generating circuit becomes equal to or higher than a predetermined value, and to select the midmost area of the picture with priority as the in-focus target area in accordance with an instruction from the instructing circuit for center area priority control.

According to another aspect of the present invention, when the maximum value of the focus evaluating value is detected during the automatic focusing operation, in which the entire area or the central area of the picture is selected as the in-focus target area, a subsequent alternation of the in-focus target area between the entire area and the central area of the picture is prohibited.

According to a further aspect of the present invention, after the automatic focusing operation is terminated, when an in-focus target area set in the preceding automatic focusing operation is the entire area or the central area of the picture, the set in-focus target area is selected as an in-focus target area to be set after the automatic focusing operation restarts.

According to a still further aspect of the present invention, when the in-focus target area set in the preceding automatic focusing operation is the midmost area of the picture, and the peak value of the focus evaluating value is not obtained during the preceding automatic focusing operation, an enlarged area of the midmost area is selected as an in-focus target area to be set after the automatic focusing operation restarts.

According to still another aspect of the present invention, when the in-focus target area set in the preceding automatic focusing operation is the midmost area of the picture, and the peak value of the focus evaluating value is obtained during the preceding automatic focusing operation, an enlarged area of the midmost area is selected as an in-focus target area to be set after the automatic focusing operation restarts if the focus evaluating value of the midmost area is equal to or lower than a predetermined value.

Therefore, a principal advantage of the present invention is that an excellent automatic focusing operation is enabled by selecting with the highest possible priority the central area of the picture where an object to be brought into focus is most likely to exist in general, as an in-focus target area in the automatic focusing operation.

Another advantage of the present invention is that a superior automatic focusing operation is enabled by giving priority to the intention of a user with respect to the in-focus target area in accordance with a manual operation by the photographer.

A further advantage of the present invention is that since the in-focus target area can be enlarged when the midmost area of the picture is improper as the in-focus target area, the focusing lens is prevented from being locked in positions other than an in-focus position.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
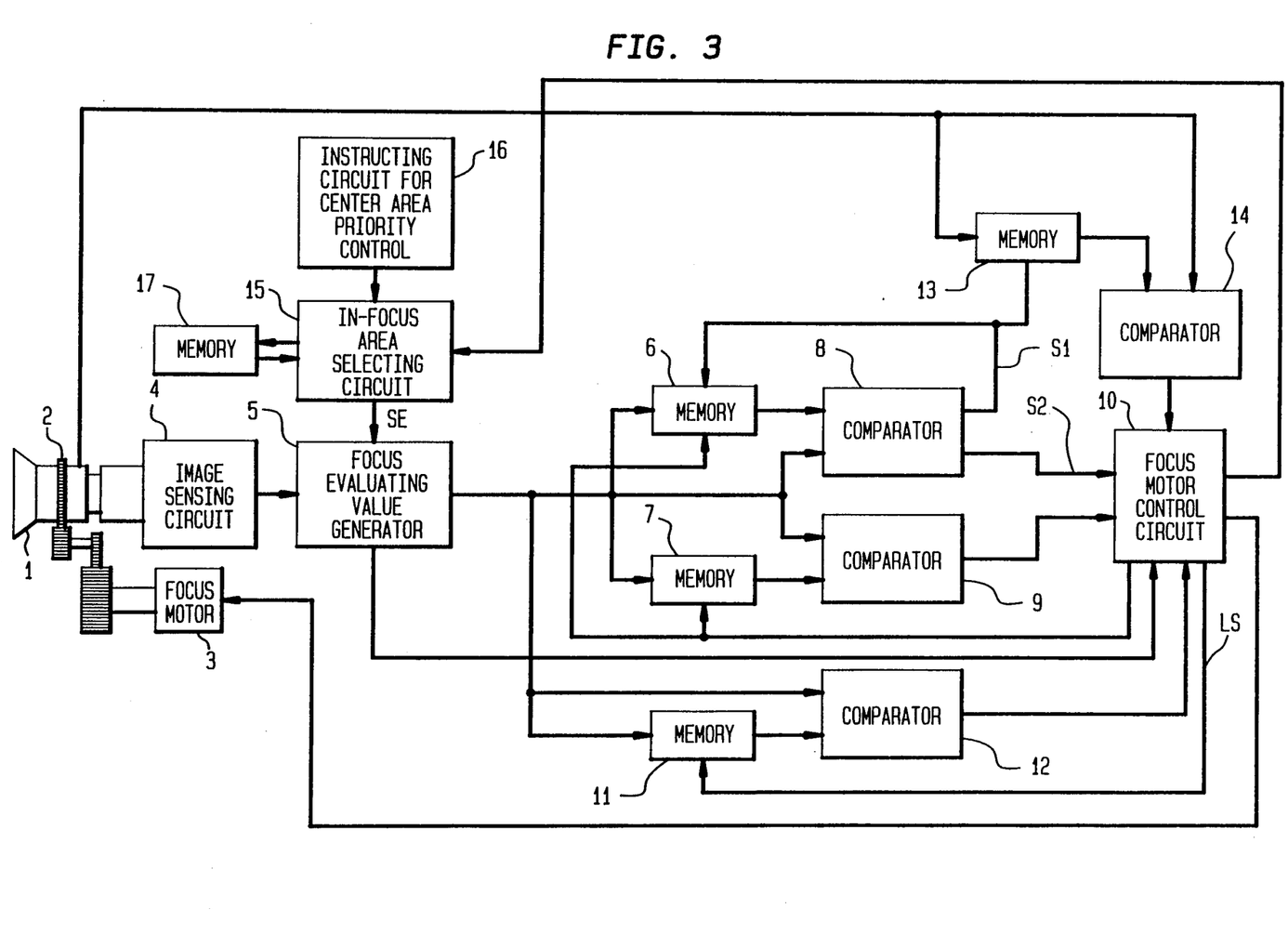
FIG. 3 is a schematic block diagram showing automatic focusing apparatus according to one embodiment of the present invention.

FIG. 3 is a schematic block diagram showing automatic focusing apparatus according to one embodiment of the present invention. The embodiment shown in FIG. 3 is the same as the conventional automatic focusing apparatus shown in FIG. 1 except the following points.

That is, in the embodiment of FIG. 3, three types of areas are provided as an in-focus target area in a picture, i.e., the entire area, the central area (having an areal size ¼ that of the entire area) and the midmost area (having an areal size 1/16 that of the entire area) of the picture. The selection of these three types of areas is made by gate control circuit 5b (FIG. 2) constituting focus evaluating value generating circuit 5 in response to an area selecting signal SE from an in-focus target area selecting circuit 15. When the entire area of the picture is selected as the in-focus target area, a focus evaluating value of the central area of the picture is separately evaluated, so that focus evaluating values with respect to these two areas should be simultaneously evaluated in this case, as will be described later. Thus, focus evaluating value generating circuit 5 in this embodiment includes two systems for evaluation of the focus evaluating values, each constituted by synchronization separating circuit 5a through A/D converting circuit 5g as shown in FIG. 2. The above-described entire area of the picture should merely require a larger areal size than that of the central area of the picture, but does not necessarily need to cover the overall surface of the picture.

A memory 17 serves to store a flag which will be described later and is set in response to a signal from in-focus target area selecting circuit 15 when the in-focus target area is switched from the entire area to the central area of the picture. A signal indicating whether or not the flag is set is applied to in-focus target area selecting circuit 15.

When a user manually sets the in-focus target area in the midmost area of the picture, as will be described later, an instructing circuit 16 for center area priority control generates a signal for switching the in-focus target area to the midmost area in response to the manual setting operation by the user and then applies the generated signal to in-focus target area selecting circuit 15.

A focus evaluating value from focus evaluating value generating circuit 5 is directly applied as an input to a focusing motor control circuit 10. In response to the input of the focus evaluating value, focusing motor control circuit 10 performs various processings such as a monitor of the level of a focus evaluating value of the central area of the picture, as will be described later. As a result, focusing motor control circuit 10 generates various types of signals and applies the same to in-focus target area selecting circuit 15. In-focus target area selecting circuit 15, as described above, generates the foregoing area selecting signal SE in response to the various signals applied from memory 17, instructing circuit 16 and focusing motor control circuit 10.

Figure 4:
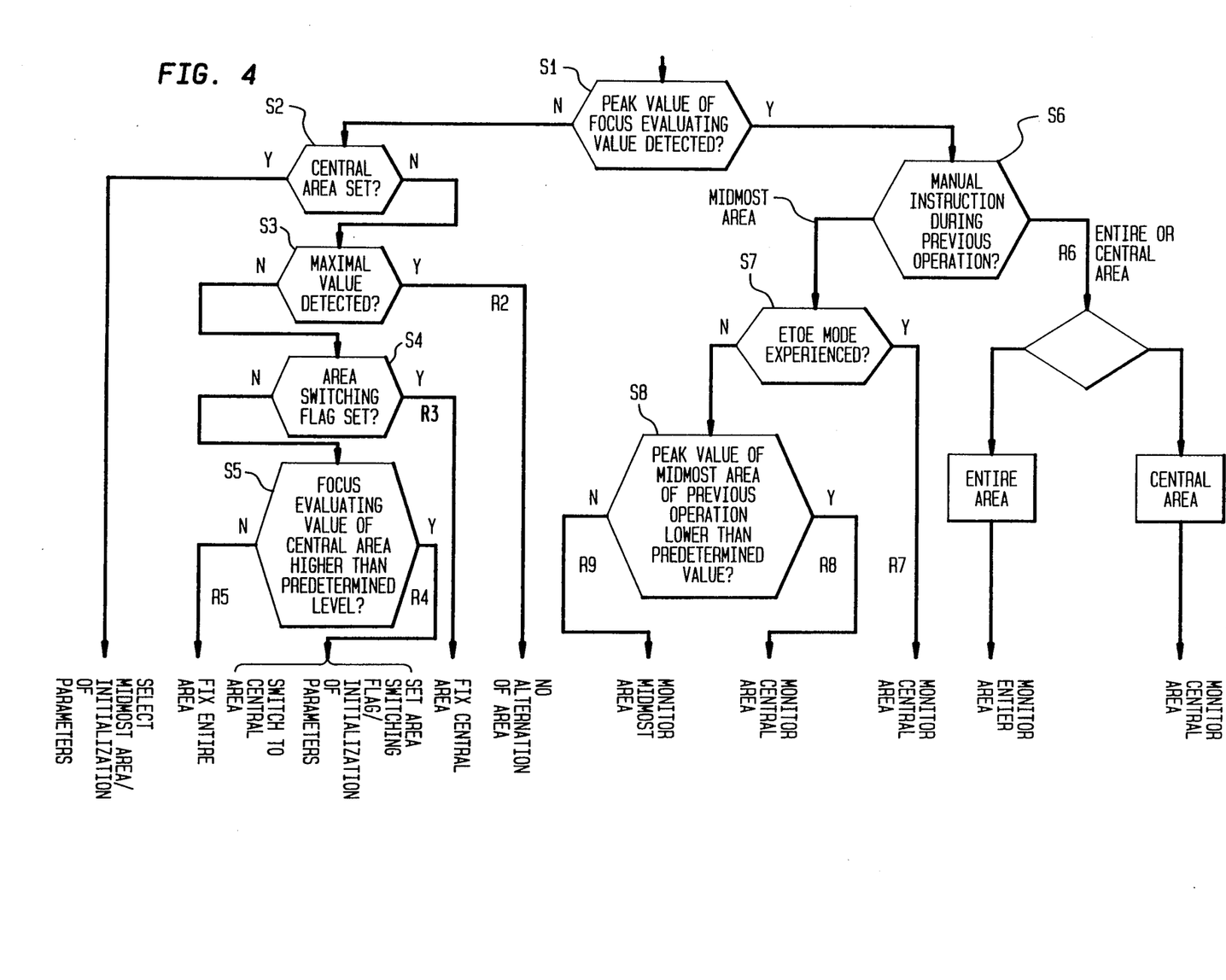
FIG. 4 is a flow chart for explaining an operation of the embodiment shown in FIG. 3.

An operation of the embodiment shown in FIG. 3 can be processed on a software basis by a microprocessor. FIG. 4 is a flow chart showing the operation of the embodiment of FIG. 3 implemented on the software basis by employing the microprocessor. A description is now made on the operation of one embodiment of the present invention with reference to FIGS. 3 and 4.

With reference to FIG. 4, the entire area of the picture is first selected as the in-focus target area, so that an automatic focusing operation starts. All control parameters stored in memories 6, 7, 11, 13 and 17 are initialized before the start of the automatic focusing operation.

In this embodiment, a focus evaluating value is first evaluated with respect to the entire area of the picture, which is the in-focus target area, and at the same time, a focus evaluating value with respect to the central area of the picture is also evaluated. Then, the automatic focusing operation is not interrupted until a peak value of the focus evaluating value is detected in step S1. A determination is then made as to whether or not there is an instruction by manual operation of setting the in-focus target area in the midmost area of the picture during the automatic focussing operation, in step S2. When a determination is made that there is the instruction in step S2, all the control parameters stored so far in the memories of FIG. 3 are initialized. Thereafter, the midmost area of the picture is selected as the in-focus target area, so that the automatic focusing operation continues until a predetermined peak value of the focus evaluating value is obtained (route R 1 of FIG. 4).

Conversely, if there is no instruction of manually setting the area (step S2), a determination is made as to whether or not the maximal value of the focus evaluating value with respect to the entire area of the picture is detected, in the next step S3. The maximal value of the focus evaluating value is a maximum value which does not entail a decrease in level by more than a predetermined first threshold value as in the foregoing case of the peak value. More specifically, when the maximal value is detected in step S3, the automatic focusing operation continues because an in-focus state should not yet be determined. When the maximal value is detected, however, it is considered that there exists within the in-focus target area an object that may be regarded as the target of focusing. Thus, no alteration of the in-focus target area is made thereafter, so that the automatic focusing operation continues until the peak value of the focus evaluating value with respect to that in-focus target area is obtained (route R 2 of FIG. 4).

If the foregoing maximal value is not yet detected (step S3), a determination is made as to whether or not the switching of the in-focus target area from the entire area to the central area of the picture has been made so far, in the next step S4. When the in-focus target area is here switched from the entire area to the central area of the picture as described above, a flag is set in memory 17 of FIG. 3. Accordingly, it is checked as to whether or not the flag is set in memory 17. As a result, if a determination is made in step S4 that the in-focus target area is switched, the automatic focusing operation continues with the in-focus target area kept to be fixed in the central area of the picture (route R3 of FIG. 4).

Conversely, if a determination is made that the in-focus target area is not switched from the entire area to the central area of the picture (step S4), a determination is made as to whether or not the focus evaluating value with respect to the central area of the picture, which is detected simultaneously with the detection of the focus evaluating value with respect to the entire area as described above, is higher than a predetermined level, in step S5. It is considered that a certain high level of the focus evaluating value of the central area of the picture indicates that an object to be brought into focus exists within this area. Thus, when a determination is made that the focus evaluating value of the central area is higher than a predetermined level in step S5, the in-focus target area is switched from the entire area to the central area, so that the automatic focusing operation is performed (route R4 of FIG. 4). At this time, a flag is set in memory 17, and the control parameters stored in the other memories 6, 7, 11 and 13 are initialized.

Conversely, if the focus evaluating value of the central area is lower than a predetermined level (step S5), the automatic focusing operation continues with the in-focus target area remaining to be fixed in the entire area of the picture (route R5 of FIG. 4).

When the selection of the midmost area of the picture is released by manual operation, the in-focus target area is changed from the midmost area to the entire area of the picture.

Next, returning to step S1 of FIG. 4, when a peak value of the focus evaluating value (or the maximum value of the focus evaluating value in the ETOE mode) is detected, the automatic focusing operation is terminated, so that focusing lens 1 stops at an in-focus position. Thereafter, the program enters in a mode for monitoring whether or not an object changes or moves. In this monitor mode, if the change or movement of the object is detected in accordance with a change of the focus evaluating value, the automatic focusing operation restarts.

In more detail, in the monitor mode, if a comparator 12 detects that the present focus evaluating value supplied from focus evaluating value generating circuit 5 decreases by a second threshold value or more as compared with the focus evaluating value held in memory 11 upon the termination of the automatic focusing operation as described above, a determination is made that there is a change or a movement of the object. In addition, when the focusing lens is slightly moved to positions forward and backward from the in-focus position set upon the termination of the automatic focusing operation, and then focus evaluating values at these positions are evaluated and compared with the focus evaluating value obtained upon termination of the automatic focusing operation, so that a determination is made that the original stop position is no longer a peak position of the focus evaluating value, determination is made that there is a change or a movement of the object.

In the above-described monitor mode, the in-focus target area for evaluating the focus evaluating value employed to detect the change or movement of the object is determined according to the following procedure.

With reference to FIG. 4, a determination is made in step S6 as to whether or not there is an instruction by manual operation for setting the in-focus target area in the midmost area of the picture during the previous automatic focusing operation. If a determination is made that there is no such instruction in step S6, a focus evaluating value of the same area as the in-focus target area in the previous automatic focusing operation is evaluated and employed in the monitor of the change of the object (route R6 of FIG. 4).

Conversely, if a determination is made that there is the instruction of setting the area by manual operation in the previous automatic focusing operation (step S6), a determination is made in the next step S7 as to whether or not an in-focus position is determined in accordance with the maximum value of the focus evaluating value in the ETOE mode in the previous automatic focusing operation. If a determination is made in step S7 that the in-focus position is determined in the ETOE mode, a focus evaluating value of the central area of the picture is evaluated and employed in the monitor of the change of the object because the in-focus target area is preferably enlarged for the following reason (route R7 of FIG. 4).

That is, the termination of the previous automatic focusing operation in the ETOE mode means that a predetermined peak value of the focus evaluating value can not be obtained. It is considered most probable that a position where the focus evaluating value becomes the maximum value due to noise or the like is determined as the in-focus position, so that focusing lens 1 is stopped at this position. In this case, the state of focusing is an out-of-focus state. In this state, if a determination as to whether the automatic focusing operation restarts or not is made in accordance with the focus evaluating value of the midmost area of the picture, a detection cannot be made on a change of the focus evaluating value, which is sufficient to instruct the restart of the automatic focusing operation. Consequently, the position of the focusing lens is fixed in the out-of-focus state. For this reason, the in-focus target area is enlarged when a determination is made that the in-focus position is determined in the ETOE mode.

On the other hand, if a determination is made that the ETOE mode is not experienced in the previous automatic focusing operation, and a predetermined peak value of the focus evaluating value is detected, so as to determine the in-focus position (step S7), a determination is then made in step S8 as to whether or not the peak value set upon the termination of the previous automatic focusing operation is equal to or lower than a predetermined level. If it is determined that the peak value is equal to or lower than the predetermined level in step S8, the in-focus target area is enlarged, and the focus evaluating value of the central area of the picture is evaluated for the same reason as in the foregoing step S7 (route R8 of FIG. 4). More specifically, even if the peak value of the focus evaluating value is detected in the previous automatic focusing operation, so that the ETOE mode is not experienced, an object having a still higher peak value in the outer area of the midmost area of the picture is likely to exist when the peak value of the midmost area is a low value.

Conversely, if a determination is made that the peak value set upon the termination of the previous automatic focusing operation is higher than the predetermined level (step S8), the focus evaluating value is evaluated, with the midmost area remaining to be the in-focus target area, and then employed in the monitor of the change of the object.

As has been mentioned above, according to one embodiment of the present invention, it is possible to select with the priority, as the in-focus target area, the central area of the picture where an object to be brought into focus is most likely to exist in general, in the automatic focusing operation, and it is also possible to give priority to the intention of a user with respect to the in-focus target area in accordance with the manual operation of the user. Therefore, an excellent automatic focusing operation following a change of the object can be performed. In addition, since the in-focus target area can be expanded to the central area of the picture when the midmost area is improper as the in-focus target area, the focusing lens is prevented from being locked at positions other than the in-focus position.

While such a case has been described that the signal taking the maximum value at the in-focus position is employed as the focus evaluating value in the foregoing embodiment, the same effect can be obtained when a circuit for detecting the minimum value by employing a signal taking the minimum value at the in-focus position as the focus evaluating value is provided so as to maintain the minimum value of the detected value.

Moreover, while the focusing ring position signal generated from focusing ring 2 is held in focusing ring position memory 13, so that comparator 14 compares a focusing ring position signal corresponding to the maximum value of the focus evaluating value with the present focusing ring position signal in the foregoing embodiment, the same effect can be obtained when a focusing motor position signal is detected from focusing motor 3 and employed in place of the focusing ring position signal.

Further, the detection of the focus evaluating value may be made every one frame not every one field.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing apparatus for automatically matching a focus relative to an object in response to a video signal obtained from image sensing means including a focusing lens (1) and an image sensing device, comprising:
    relative position altering means (2, 3) for altering a relative position of said focusing lens with respect to said image sensing device along an optical axis;
    area setting means for setting by time-division of said video signal a first area located in a midmost area of an image-sensed picture, a second area including said first area and having a larger areal size than that of said first area, and a third area including said second area and having a larger areal size than that of said second area;
    in-focus target area selecting means for selecting any of said first, second and third areas as an in-focus target area to be a target of a focusing operation;
    means for manually setting said first area as the in-focus target area;
    first focus evaluating value detecting means for detecting a high frequency level in a video signal in the in-focus target area selected by said in-focus target area selecting means for each constant time period, to supply the detected high frequency level as a focus evaluating value taking a peak value at an in-focus position;
    control means (6, 7, 8, 9, 10, 13, 14) responsive to said focus evaluating value for controlling said relative position altering means so as to shift the relative position of said focusing lens to a position where said focus evaluating value becomes a peak value;
    second focus evaluating value detecting means for detecting a focus evaluating value in said second area, to supply the detected focus evaluating value when said third area is selected as the in-focus target area;
    means (10) for controlling said in-focus target area selecting means so as to select said third area as the in-focus target area when the focusing operation starts, and to switch the in-focus target area from said third area to said second area when said focus evaluating value supplied from said second focus evaluating value detecting means becomes equal to or higher than a predetermined value; and
    means for controlling said in-focus target area selecting means so as to select with priority said first area as the in-focus target area when said first area is manually set as the in-focus target area.

2. The automatic focusing apparatus according to claim 1, further comprising
    means for prohibiting the subsequent alteration of the in-focus target area between said second and third areas when the maximal value of the focus evaluating value supplied from said first focus evaluating value detecting means is detected during the focusing operation, in which said second or third area is selected as the in-focus target area.

3. The automatic focusing apparatus according to claim 1, further comprising
    means (15, 17) for fixing the in-focus target area in said second area after the in-focus target area is once switched from said third area to said second area.

4. The automatic focusing apparatus according to claim 1, further comprising
    means (10, 11, 12) for restarting the focusing operation by detecting a change of the focus evaluating value supplied from said first focus evaluating value detecting means after the focusing operation for shifting the relative position of said focusing lens to an in-focus position is terminated, and
    means for maintaining the previously selected area as the in-focus target area after the focusing operation restarts, when the in-focus target area in the previous focusing operation is said second or third area.

5. The automatic focusing apparatus according to claim 1, further comprising
    means (10, 11, 12) for restarting the focusing operation by detecting a change of the focus evaluating value supplied from said first focus evaluating value detecting means after the focusing operation for shifting the relative position of said focusing lens to the in-focus position is terminated, and
    means for selecting an enlarged area of said first area as the in-focus target area set after the focusing operation restarts, when the in-focus target area in the previous focusing operation is said first area, and a peak value being the maximum value of said focus evaluating value and entailing thereafter a decrease in level corresponding to a predetermined width, is not obtained during said previous focusing operation, so that a position where the maximum value of said focus evaluating value set during said focusing operation is obtained is determined as the in-focus position instead.

6. The automatic focusing apparatus according to claim 5, wherein
    said enlarged area of said first area is said second area.

7. The automatic focusing apparatus according to claim 1, further comprising
    means (10, 11, 12) for restarting the focusing operation by detecting a change of the focus evaluating value supplied from said first focus evaluating value detecting means after the focusing operation for shifting the relative position of said focusing lens to the in-focus position is terminated, and
    means for selecting an enlarged area of said first area as the in-focus target area set after the focusing operation restarts if the focus evaluating value of said first area is lower than or equal to a predetermined value, when the in-focus target area in the previous focusing operation is said first area, and the position where the peak value being the maximum value of said focus evaluating value and entailing thereafter a decrease in level corresponding to a predetermined width, is obtained is determined as the in-focus position during said previous focusing operation.

8. The automatic focusing apparatus according to claim 7, wherein
said enlarged area of said first area is said second area.

9. An automatic focusing method in an image sensing apparatus including:
image sensing means including a focusing lens (1) and an image sensing device,
relative position altering means (2, 3) for altering a relative position of said focusing lens with respect to said image sensing device along an optical axis,
area setting means for setting by time-division of a video signal a first area located in a midmost area of an image-sensed picture, a second area including said first area and having a larger areal size than that of said first area, and a third area including said second area and having a larger areal size than that of said second area,
in-focus target area selecting means (15) for selecting any of said first, second and third areas as an in-focus target area to be a target of a focusing operation,
means (16) for manually setting said first area as the in-focus target area,
focus evaluating value detecting means for detecting a high frequency level in a video signal in the in-focus target area selected by said in-focus target area selecting means for each constant time period, to supply the detected high frequency level as a focus evaluating value taking a peak value at an in-focus position, and
control means (6, 7, 8, 9, 10, 13, 14) responsive to said focus evaluating value for controlling said relative position altering means so as to shift the relative position of said focusing lens to a position where said focus evaluating value becomes a peak value, said method comprising the steps of:
selecting said third area as the in-focus target area, to start the focusing operation;
detecting a focus evaluating value in said second area, to supply the detected focus evaluating value when said third area is selected as the in-focus target area;
controlling said in-focus target area selecting means so as to switch the in-focus target area from said third area to said second area when the focus evaluating value in said second area becomes higher than or equal to a predetermined value when said third area is selected as the in-focus target area; and
controlling said in-focus target area selecting means so as to select with priority said first area as the in-focus target area when said first area is manually set as the in-focus target area.

10. The automatic focusing method according to claim 9, further comprising the step of
prohibiting the subsequent alteration of the in-focus target area between said second and third areas when the maximal value of the focus evaluating value supplied from said focus evaluating value detecting means is detected during the focusing operation, in which said second or third area is selected as the in-focus target area.

11. The automatic focusing method according to claim 9, further comprising the step of
fixing the in-focus target area in said second area after the in-focus target area is once switched from said third area to said second area.

12. The automatic focusing method according to claim 9, further comprising the steps of
after a focusing operation for shifting the relative position of said focusing lens to an in-focus position, detecting a change of the focus evaluating value supplied from said focus evaluating value detecting means, to restart the focusing operation, and
maintaining the previously selected area as the in-focus target area after the focusing operation restarts, when the in-focus target area in the previous focusing operation is said second or third area.

13. The automatic focusing method according to claim 9, further comprising the steps of
after a focusing operation for shifting the relative position of said focusing lens to an in-focus position, detecting a change of the focus evaluating value supplied from said focus evaluating value detecting means, to restart the focusing operation, and
selecting an enlarged area of said first area is the in-focus target area set after the focusing operation restarts, when the in-focus target area in the previous focusing operation is said first area, and a peak value being the maximum value of said focus evaluating value and entailing thereafter a decrease in level corresponding to a predetermined width, is not obtained during said previous focusing operation, so that a position where the maximum value of said focus evaluating value during said focusing operation is obtained is determined as the in-focus position instead.

14. The automatic focusing method according to claim 13, wherein
said enlarged area of said first area is said second area.

15. The automatic focusing method according to claim 9, further comprising the steps of
after a focusing operation for shifting the relative position of said focusing lens to an in-focus position, detecting a change of the focus evaluating value supplied from said focus evaluating value detecting means, to restart the focusing operation, and
selecting an enlarged area of said first area as the in-focus target area set after the focusing operation restarts if the focus evaluating value of said first area is lower than or equal to a predetermined value, when the in-focus target area in the previous focusing operation is said first area, and the position where the peak value being the maximum value of said focus evaluating value and entailing thereafter a decrease in level corresponding to a predetermined width, is obtained is determined as the in-focus position during said previous focusing operation.

16. The automatic focusing method according to claim 15, wherein
said enlarged area of said first area is said second area.

17. An automatic focusing apparatus for automatically matching a focus relative to an object in response to a video signal obtained from image sensing means including a focusing lens (1) and an image sensing device, comprising:

relative position altering means (2, 3) for altering a relative position of said focusing lens with respect to said image sensing device along an optical axis;

area setting means for setting by time-division of said video signal a plurality of areas having different areal sizes on an image-sensed picture, in-focus target area selecting means for selecting any of said plurality of areas as an in-focus target area to be a target of a focusing operation;

focus evaluating value detecting means for detecting a high frequency level in a video signal in the in-focus target area selected by said in-focus target area selecting means for each constant time period, to supply the detected high frequency level as a focus evaluating value taking a peak value at an in-focus position;

control means (6, 7, 8, 9, 10, 13, 14) responsive to said focus evaluating value for controlling said relative position altering means so as to shift the relative position of said focusing lens to a position where said focus evaluating value becomes a peak value;

means (10, 11, 12) for restarting the focusing operation by detecting a change of the focus evaluating value supplied from said focus evaluating value detecting means after the focusing operation for shifting the relative position of said focusing lens to the in-focus position is terminated; and means (10, 15) for selecting an enlarged area of said in-focus target area in the previous focusing operation as the in-focus target area after the focusing operation restarts, when a peak value being the maximum value of said focus evaluating value and entailing thereafter a decrease in level corresponding to a predetermined width, is not obtained during said previous focusing operation, so that a position where the maximum value of said focusing evaluating value during said focusing operation is obtained is determined as the in-focus position instead.

18. An automatic focusing apparatus for automatically matching a focus relative to an object in response to a video signal obtained from image sensing means including a focusing lens (1) and an image sensing device, comprising:

relative position altering means (2, 3) for altering a relative position of said focusing lens with respect to said image sensing device along an optical axis;

area setting means for setting by time-division of said video signal a plurality of areas having different areal sizes on an image-sensed picture, in-focus target area selecting means (15) for selecting any of said plurality of areas as an in-focus target area to be a target of a focusing operation;

focus evaluating value detecting means for detecting a high frequency level in a video signal in the in-focus target area selected by said in-focus target area selecting means for each constant time period, to supply the detected high frequency level as a focus evaluating value taking a peak value at an in-focus position;

control means (6, 7, 8, 9, 10, 13, 14) responsive to said focus evaluating value for controlling said relative position altering means so as to shift the relative position of said focusing lens to a position where said focus evaluating value becomes a peak value;

means (10, 11, 12) for restarting the focusing operation by detecting a change of the focus evaluating value supplied from said focus evaluating value detecting means after the focusing operation for shifting the relative position of said focusing lens to the in-focus position is terminated, and means (10, 15) for selecting an enlarged area of said in-focus target area in the previous focusing operation as the in-focus target area after the focusing operation restarts if the focus evaluating value of said in-focus target area in the previous focusing operation is lower than or equal to a predetermined value, when the position where the peak value being the maximum value of said focus evaluating value and entailing thereafter a decrease in level corresponding to a predetermined width is obtained is determined as the in-focus position during said previous focusing operation.

19. An automatic focusing method in an image sensing apparatus including:

image sensing means including a focusing lens (1) and an image sensing device, relative position altering means (2, 3) for altering a relative position of said focusing lens with respect to said image sensing device along an optical axis, area setting means for setting by time-division of a video signal a plurality of areas having different areal sizes on an image-sensed picture, in-focus target area selecting means (15) for selecting any of said plurality of areas as an in-focus target area to be a target of a focusing operation, focus evaluating value detecting means (5) for detecting a high frequency level in a video signal in the in-focus target area selected by said in-focus target area selecting means for each constant time period, to supply the detected high frequency level as a focus evaluating value taking a peak value at an in-focus position, and control means (6, 7, 8, 9, 10, 13, 14) responsive to said focus evaluating value for controlling said relative position altering means so as to shift the relative position of said focusing lens to a position where said focus evaluating value becomes a peak value, said method comprising the steps of:

after a focusing operation for shifting the relative position of said focusing lens to an in-focus position, detecting a change of the focus evaluating value supplied from said focus evaluating value detecting means, to restart the focusing operation, and selecting an enlarged area of said in-focus target area in the previous focusing operation as the in-focus target area after the focusing operation restarts, when a peak value being the maximum value of said focus evaluating value and entailing thereafter a decrease in level corresponding to a predetermined width, is not obtained during said previous focusing operation, so that a position where the maximum value of said focus evaluating value during said focusing operation is obtained is determined as the in-focus position instead.

20. An automatic focusing method in an image sensing apparatus including:

image sensing means including a focusing lens (1) and an image sensing device, relative position altering means (2, 3) for altering a relative position of said focusing lens with respect to said image sensing device along an optical axis, area setting means for setting by time-division of a video signal a plurality of areas having different areal sizes on an image-sensed picture, in-focus target area selecting means (15) for selecting any of said plurality of areas as an in-focus target area to be a target of a focusing operation, focus evaluating value detecting means for detecting a high frequency level in a video signal in the in-focus target area selected by said in-focus target area selecting means for each constant time period, to supply the detected high frequency level as a focus evaluating value taking a peak value at an in-focus position, and control means (6, 7, 8, 9, 10, 13, 14) responsive to said focus evaluating value for controlling said relative position altering means so as to shift the relative position of said focusing lens to a position where said focus evaluating value becomes a peak value, said method comprising the steps of:

after a focusing operation for shifting the relative position of said focusing lens to an in-focus position, detecting a change of the focus evaluating value supplied from said focus evaluating value detecting means, to restart the focusing operation, and selecting an enlarged area of said in-focus target area in the previous focusing operation as the in-focus target area after the focusing operation restarts if the focus evaluating value of said in-focus target area in the previous focusing operation is lower than or equal to a predetermined value, when the in-focus target area in the previous focusing operation is said first area, and the position where the peak value being the maximum value of said focus evaluating value and entailing thereafter a decrease in level corresponding to a predetermined width, is obtained is determined as the in-focus position during said previous focusing operation.

* * * * *